April 13, 1965      C. W. HART      3,177,587
MEANS AND TECHNIQUES FOR MOUNTING A TELESCOPE ON A RIFLE
Filed Dec. 31, 1962
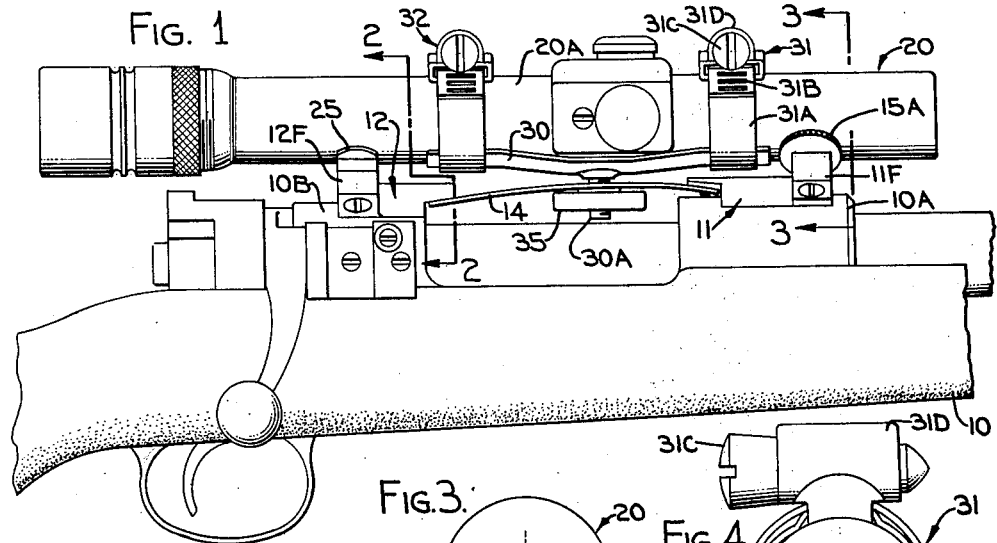
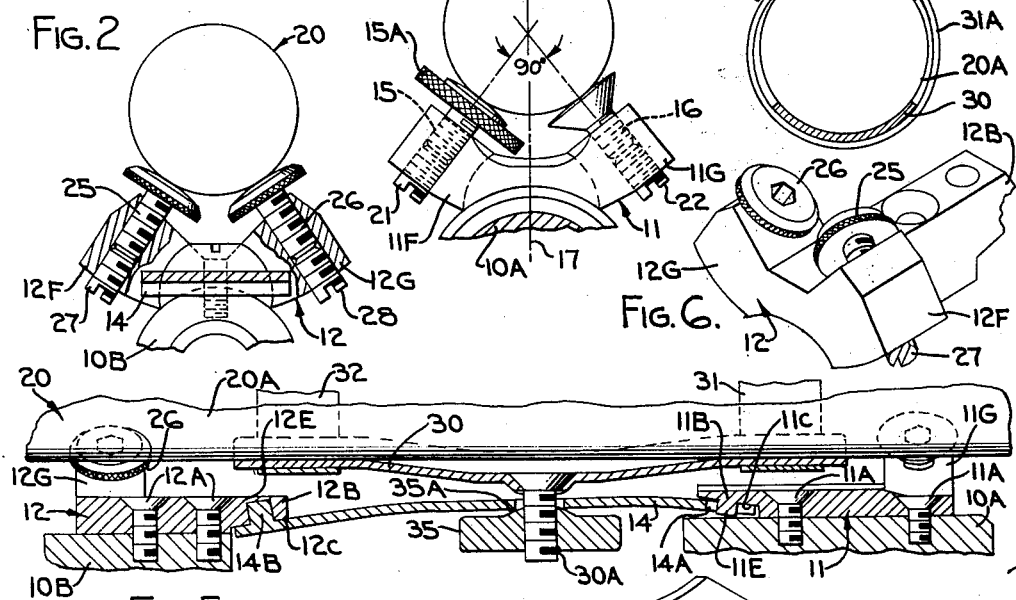
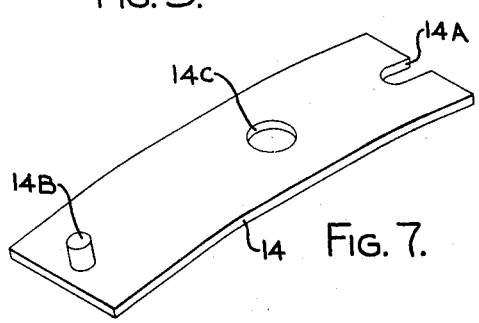
INVENTOR.
CHARLES W. HART
BY
ATTORNEYS.

United States Patent Office 3,177,587
Patented Apr. 13, 1965

3,177,587
MEANS AND TECHNIQUES FOR MOUNTING A TELESCOPE ON A RIFLE
Charles W. Hart, P.O. Box 735, Grass Valley, Calif.
Filed Dec. 31, 1962, Ser. No. 248,762
11 Claims. (Cl. 33—50)

The present invention relates to means and techniques useful in the mounting of a telescope on a rifle.

Briefly, the apparatus described herein involves a pair of spaced supporting members mounted on a rifle, each of such members comprising a V-shaped adjustable support for a telescope. A resilient bowed spring extends between the supporting members with an intermediate portion of the spring being connected to a base plate for the telescope, the telescope being adjustably mounted on the base plate and the spring urging the telescope against the V-shaped supports. The spring is particularly effective in the firing of the rifle to firmly seat the telescope during those times when rifle recoil and counter recoil forces are being developed. The spring absorbs the initial shock impact of rifle recoil with the energy stored in the spring being released before counter recoil occurs to more firmly seat the telescope in its V-mounts and thereby counteract the tendency of "barrel whip" to separate the telescope from the rifle mount. Using this construction, the telescope is normally maintained on the rifle without excessive clamping forces which are likely to distort the telescope barrel.

It is therefore a general object of the present invention to provide a telescope mount having the above-indicated features.

A specific object of the present invention is to provide improved means and techniques for aligning a telescope sight on a rifle with such means allowing the removal and replacement of the telescope on the rifle without affecting point of aim or impact and featuring elevation and windage adjustments combined in V-type supports which are also capable of accommodating telescope barrels of different diameters.

Another specific object of the present invention is to provide means and techniques as described in the preceding paragraph featured also by a construction which reduces and absorbs the initial impact of rifle recoil to the telescsope and effectively dissipates counter recoil forces, the recoil forces being used to seat and stabilize the telescope in its V-mount.

Another specific object of the present invention is to provide a mount for a telescope which has the advantages of V-block alignment.

Another specific object of the present invention is to provide a construction of this character incorporating a simple means to adjust for either windage, elevation, or both.

Another object of the present invention is to provide a construction of this character incorporating means to correct the point of aim from any mounted position of the telescope in the mount regardless of height or lateral position of the mounting or the diameter of the telescope barrel with the windage and elevation adjustments being effected at either or both ends of the telescope.

Another specific object of the present invention is to provide a construction of this character wherein absorption of the first hammer-like impact of the recoil removes the cause by which the recoil moves the telescope in its mount and at the same time uses the effect of the initial impact to seat the telescope more securely in the mount to cancel or counteract the effect of muzzle blast and whip to unseat the telescope from the mount.

Another specific object of the present invention is to provide a construction of this character wherein the hammer-like impact of rifle recoil is absorbed in a spring construction which connects the telescope to the rifle, the construction being such that the telescope is pulled with but after the recoil impact.

Another specific object of the present invention is to provide a construction of this character wherein a spring serves as a means to attach the telescope to the rifle, with the spring being flexible to avoid distortion to the mounted telescope barrel when associated clamping means are tightened for maximum retention.

Another specific object of the present invention is to provide a spring mounting for a telescope with a spring absorbing the expansion of parts resulting from the use of materials having different coefficients of expansion, to thereby obviate distortion in the telescope which might otherwise develop as a result of thermally developed forces.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

FIGURE 1 illustrates a telescope mounted on a rifle using means and techniques embodying features of the present invention.

FIGURES 2 and 3 are sectional views taken generally along corresponding lines 2—2 and 3—3 in FIGURE 1.

FIGURE 4 illustrates one of the clamping means incorporated in the arrangement of FIGURE 1.

FIGURE 5 is generally a longitudinal sectional view through the mounting means illustrated in FIGURE 1.

FIGURE 6 is a perspective view of one of the supporting members in FIGURE 1.

FIGURE 7 is a perspective view showing a spring element used in FIGURE 1.

FIGURE 8 is a perspective view illustrating another one of the supporting members used in FIGURE 1.

Referring to the drawings, a conventional rifle 10 has mounted thereon two spaced support members 11 and 12 using respectively pairs of countersunk head machine screws 11A and 12A passing therethrough, the screws 11A and 12A being threaded respectively into tapped holes in the front rifle receiver portion 10A and rear rifle receiver portion 10B to thereby firmly clamp and secure the generally arcuate underside portions of members 11 and 12 to generally conforming rounded surfaces of the rifle.

The front support member 11, as seen in FIGURES 5 and 8, has a rearwardly extending tapered portion 11B which defines a rearwardly and upwardly extending tapered surface 11C from which a guide pin 11E extends, all for slidably and guidingly supporting one end of a flat stock leaf-type spring 14 having an open-ended slot 14A (FIGURES 5 and 7) therein making a sliding fit with pin 11E.

The front support member 11 also, as shown in FIGURE 3, is formed with two outwardly and upwardly extending arm portions 11F and 11G into each of which is threaded adjustment screws 15 and 16, respectively, with the axis of each screw making generally a forty-five degree angle with a vertical line 17 passing through the axis of the rifle bore and with the included angle between the screw axes being generally ninety degrees as indicated in FIGURE 3. These two screws 15 and 16 each have a rounded, generally spherical head on which the telescope 20 rests and thus provide an adjustable V-mount for the front end of the telescope 20. Either one or both of such screws 15, 16 is provided with a knurled portion 15A for ease of manual adjustment and their adjustments may be maintained or secured by corresponding locking set screws 21 and 22 threaded in the same tapped hole as are corresponding screws 15, 16.

The rear support member 12, as shown in FIGURE 2, is similarly formed with arm portions 12F, 12G into which corresponding knurled and spherical-headed adjustment screws 25, 26 and their corresponding locking set screws 27 and 28 are threaded to provide a like adjustable V-mount for the rear portion of telescope 20.

The support member 12 also, as shown in FIGURES 6 and 5, has a forwardly extending tapered portion 12B, the underside of which defines a forwardly and upwardly extending tapered surface 12C through which a bore hole 12E extends for snugly receiving the pin 14B on the rear end of spring element 14, all for securing such end of the spring 14 on the support 12.

A base plate 30, as shown in FIGURES 5 and 1, having a generally arcuate surface conforming with the cylindrical telescope housing portion 20A, is releasably clamped thereto by two screw-actuated clamps 31 and 32, each illustrated as being of conventional construction involving a flexible encircling steel band 31A with spaced grooved portions 31B therein engaged by the kerfed adjustment screw 31C which is journaled for rotation in its housing 31D (FIGURE 4) fixedly mounted on the innermost turn or inner end of band 31A.

The base plate 30 (FIGURES 5 and 7) has a stud bolt 30A extending downwardly therefrom, such bolt extending slidingly through the apertured portion 14C in spring element 14 and having a shouldered nut 35 threaded thereon to use stored energy in spring 14 to seat the telescope 20 in its front and rear V-mounts 11 and 12. It will be seen that the spring apertured portion 14C is located forwardly of a mid-point between the supports for the ends of spring 14 and also that the nut surface 25A contacting the spring is of smaller diameter than the outer portion of the nut, all for purposes described later.

Using this construction, it will be seen that a small spring force developed by spring 14 normally adequately seats the telescope 20 in its V-block-type supports 11 and 12. This initial, normally small spring force is augmented during rifle recoil to more firmly seat the telescope 20 against its increased tendency to unseat as a result of counter recoil forces, muzzle blast and rifle whip. In other words, a greater seating force is developed by spring 14 when such seating force is needed most.

At the time of hammer-like recoil, recoil forces are absorbed in spring 14, with the spring 14 being straightened by pulling force further than shown in the drawings. During such straightening of spring 14 between pin 14B and nut 35, the forward end of the spring 14 slides on support 11 and during such sliding movement it is guided by pin 11E. The telescope is pulled with the rifle as a rigid unit thereof only after recoil impact acts on spring 14 to overcome telescope inertia. During the development of recoil and counter recoil forces, recoil energy stored in spring 14 causes a greater seating force between the telescope and its V-mounts. As the recoil forces straighten spring 14, the spring 14 is further stiffened as a result of the larger portion of nut 35 engaging the spring 14 and thereby overcoming the tendency of the telescope to become unseated. Stiffness of spring 14 is also augmented by the aditional contact of nut 35 with spring 14 when increased bowing of spring 14 is caused by any forced separation of telescope 20 from the V-mounts.

Preferably the arcuate plate 30 is of spring material to allow deformation thereof on tightening of the clamping means 31 and 32 to thereby prevent distortion of physical dimensions of the telescope. The spring-mounting plate 30 also absorbs thermally produced forces due to differences in coefficients of expansion between material of the telescope housing and the materials on which plate 30 is supported, thereby again serving as a means for preventing distortion of physical dimensions of the telescope. Also, the resiliency of base plate 30 is such as to augment the purpose and functions accomplished by main spring 14.

It will be seen also that the spherical heads of adjustment screws 15, 16, 25, and 26 provide large seating contact useful in aligning and supporting the telescope.

It will also be appreciated that these screws 15, 16, 25, and 26 provide an adjustment for elevation and windage and that suitable indicia may be placed on the same for indicating the same in terms of minutes of degrees.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. In a rifle mount of the character described, the combination comprising, a pair of spaced supporting members having means for mounting said members on the rifle, said supporting members each having a V-seat, a telescope seated in said V-seat, resilient means for holding said telescope firmly seated in said V-seat comprising a pair of elongated first and second oppositely bowed leaf spring members, means securing the ends of said first spring member to the underside of said telescope, complementally shaped means on said support members and on the ends of said second spring member for holding the latter member detachably assembled to said support members so long as the midportions of said first and second spring members are held bowed toward one another, and adjustable clamping means interconnecting the midportions of said first and second spring members normally holding the same bowed toward one another under stress and cooperating to hold said telescope firmly and immovably seated in said V-seats.

2. In a mount for a rifle, a telescope having a cylindrical portion, a base plate which is arcuate and conforms generally with the cylindrical portion which rests on said base plate, clamping means clamping ends of said base plate to said telescope, said base plate having a stud bolt extending therefrom, a pair of supporting members mountable on said rifle in spaced relationship thereon and providing seats for said telescope, a spring extending between said supporting members and having an intermediate portion thereof connected to said stud bolt.

3. An arrangement as set forth in claim 2 in which said base plate is resilient.

4. In a mount for a rifle, a pair of supporting members mountable in spaced relationship on a rifle, said members having surfaces facing the upper side of said rifle and tapering upwardly therefrom and generally toward each other lengthwise of said rifle, a leaf spring having its ends supported on and mechanically interlocking with complementally-shaped portions of said tapered surfaces, each of said supporting members having a pair of arm portions, a pair of screw-threaded members movably mounted in said arm portions with the axes of said screw members converging upwardly to a point overlying said rifle, a telescope seated against the upper ends of said screw members and having a base plate on its underside, and adjustable means interconnecting the midportions of said leaf spring and of said base plate and being operable to bow said leaf spring upwardly toward the midportion of said base plate to clamp said telescope firmly and resiliently against the upper ends of said screw-threaded members.

5. The arrangement as set forth in claim 4 in which one end of said spring is immovable along one of said surfaces and the other end of said spring is slidably mounted on the other of said tapered surfaces.

6. An arrangement as set forth in claim 4 in which said base plate is resilient.

7. An arrangement as set forth in claim 4 in which said spring is fastened to said base plate by a nut having a small portion normally engaging the spring and a large portion which contacts the spring when said spring is bowed.

8. An arrangement as set forth in claim 4 in which said spring is connected to said base plate at a point on said spring which is forward of the central portion of the spring.

9. In a mount for a rifle, a telescope, having a base plate, means releasably clamping the ends of said base plate to said telescope, a pair of supporting members mountable on said rifle in spaced relationship therealong, a leaf spring element extending between said supporting members and having its rear end socketed in a complementally shaped portion of the adjacent supporting member, means adjustably interconnecting the midportion thereof to the midportion of said base plate and operable to bow the midportion of said leaf spring and tension the same to a desired degree to clamp said telescope firmly seated against said supporting members, and each of said supporting members having a pair of adjustable seats contacting said telescope.

10. An arrangement as set forth in claim 9 in which said base plate is of spring material.

11. An arrangement as set forth in claim 9 in which said spring is attached to said base plate by a nut which has a small portion normally contacting the spring and a larger portion which engages the spring when the spring is bowed.

References Cited by the Examiner

UNITED STATES PATENTS

| 2,563,849 | 8/51 | Lebherz | 33—50 |
| 2,597,466 | 5/52 | Felix | 33—50 |
| 2,632,253 | 3/53 | Stith | 33—50 |
| 2,790,241 | 4/57 | Dickenson | 33—50 |
| 3,101,549 | 8/63 | Plisk | 33—50 |

FOREIGN PATENTS

| 598,306 | 2/48 | Great Britain. |

ISAAC LISANN, *Primary Examiner.*